US012604237B2

(12) United States Patent
Gdowski et al.

(10) Patent No.: US 12,604,237 B2
(45) Date of Patent: *Apr. 14, 2026

(54) FLEXIBLE SOFTWARE-DEFINED RADIO ACCESS NETWORK ARCHITECTURE AND METHODS FOR USE THEREWITH

(71) Applicants: ISRD Sp. z o.o., Piaseczno (PL); ISN Sp. z o.o., Piaseczno (PL)

(72) Inventors: Robert Gdowski, Warsaw (PL); Hubert Gburzynski, Sochocin (PL); Adam Dawid Flizikowski, Bydgoszcz (PL); Slawomir Pietrzyk, Piaseczno (PL)

(73) Assignees: ISRD Sp. z o.o., Piaseczno (PL); ISN Sp. z o.o., Piaseczno (PL)

( * ) Notice: Subject to any disclaimer, the term of this patent is extended or adjusted under 35 U.S.C. 154(b) by 126 days.

This patent is subject to a terminal disclaimer.

(21) Appl. No.: 18/395,970

(22) Filed: Dec. 26, 2023

(65) Prior Publication Data

US 2025/0088906 A1 Mar. 13, 2025

Related U.S. Application Data

(60) Provisional application No. 63/581,363, filed on Sep. 8, 2023.

(51) Int. Cl.
*H04W 28/086* (2023.01)
*H04W 28/08* (2023.01)

(52) U.S. Cl.
CPC ... *H04W 28/0864* (2023.05); *H04W 28/0892* (2020.05)

(58) Field of Classification Search
CPC ...................... H04W 28/0892; H04W 28/0864
See application file for complete search history.

(56) References Cited

U.S. PATENT DOCUMENTS

| 9,369,915 B2 | 6/2016 | Hooli |
| 9,763,282 B2 | 9/2017 | Pelletier |

(Continued)

FOREIGN PATENT DOCUMENTS

| CN | 102752765 A | 10/2012 |
| CN | 102804831 | 11/2012 |

(Continued)

OTHER PUBLICATIONS

3GPP; 3rd Generation Partnership Project; Technical Specification Group Radio Access Network; Coordinated multi-point operation for LTE physical layer aspects (Release 11); 3GPP TR 36.819 V11.1.0; Sep. 2013; 70 pages.

(Continued)

*Primary Examiner* — Mehmood B. Khan
(74) *Attorney, Agent, or Firm* — Katz Ruby & Carle LLP; Katherine C. Stuckman; Bruce E. Stuckman

(57) ABSTRACT

A radio access network (RAN) system includes a plurality of capsules that operate in parallel to cooperatively perform RAN stack operations, each capsule utilizing a processor and a memory configured to perform a corresponding component of the RAN stack operations. The RAN stack operations result in: communicating backhaul communications with a core communication network; communicating fronthaul communications with a plurality of radio units configured to engage in wireless communications with a plurality of user equipment (UEs) via a radio channel of a radio network; converting, in accordance with a communication standard, received fronthaul communications from the plurality of radio units into backhaul communications transmitted to the communications network; and converting, in accordance with the communication standard, received backhaul communications from the communications net- (Continued)

work into fronthaul communications transmitted to the plurality of radio units.

13 Claims, 10 Drawing Sheets

(56) References Cited

U.S. PATENT DOCUMENTS

| | | | |
|---|---|---|---|
| 9,854,597 | B2 | 12/2017 | Chen |
| 9,893,774 | B2 | 2/2018 | Shattil |
| 9,918,325 | B2 | 3/2018 | Nguyen |
| 10,440,693 | B2 | 10/2019 | Ghosh |
| 10,652,898 | B2 | 5/2020 | Qvarfordt |
| 10,779,286 | B2 | 9/2020 | Beattie, Jr. |
| 11,057,080 | B2 | 7/2021 | Lin |
| 2014/0315561 | A1 | 10/2014 | Hooli et al. |
| 2016/0113018 | A1 | 4/2016 | Li |
| 2016/0234819 | A1 | 8/2016 | Da Silva |
| 2016/0242147 | A1 | 8/2016 | Tarlazzi |
| 2016/0315754 | A1 | 10/2016 | Wu |
| 2017/0099658 | A1 | 4/2017 | Shattil |
| 2017/0126853 | A1 | 5/2017 | Goel |
| 2017/0127409 | A1 | 5/2017 | Mishra |
| 2017/0202006 | A1 | 7/2017 | Rao |
| 2017/0331577 | A1 | 11/2017 | Parkvall |
| 2017/0331670 | A1 | 11/2017 | Parkvall |
| 2018/0234875 | A1 | 8/2018 | Leroudier |
| 2019/0069278 | A1 | 2/2019 | Miyamoto |
| 2019/0090247 | A1 | 3/2019 | Qvarfordt |
| 2019/0124522 | A1 | 4/2019 | Cao |
| 2019/0274064 | A1 | 9/2019 | Chapman |
| 2020/0100102 | A1* | 3/2020 | Xu ..................... H04W 12/033 |
| 2020/0128414 | A1 | 4/2020 | Mishra |
| 2020/0137594 | A1 | 4/2020 | Notargiacomo |
| 2020/0169301 | A1 | 5/2020 | Hong |
| 2020/0195495 | A1* | 6/2020 | Parker ................... H04L 41/40 |
| 2020/0229023 | A1* | 7/2020 | Ke .................... H04W 28/0268 |
| 2020/0229049 | A1* | 7/2020 | Wu ...................... H04W 76/12 |
| 2020/0252847 | A1 | 8/2020 | Park |
| 2020/0280863 | A1 | 9/2020 | Cioffi |
| 2020/0296631 | A1* | 9/2020 | Young .................. H04W 76/36 |
| 2020/0296799 | A1* | 9/2020 | Barabell ............. H04W 88/085 |
| 2020/0304362 | A1 | 9/2020 | Palenius |
| 2020/0366341 | A1 | 11/2020 | Lin |
| 2021/0014737 | A1* | 1/2021 | Yang .................... H04W 76/11 |
| 2021/0126726 | A1 | 4/2021 | Parkvall |
| 2021/0314975 | A1 | 10/2021 | Barabell |
| 2021/0399854 | A1 | 12/2021 | Carnero |
| 2021/0409977 | A1 | 12/2021 | Dussmann et al. |
| 2022/0173849 | A1* | 6/2022 | Rahman ............... H04W 24/02 |
| 2022/0210794 | A1 | 6/2022 | Pietrzyk |
| 2022/0286877 | A1* | 9/2022 | Liu ...................... H04W 76/15 |
| 2022/0330264 | A1 | 10/2022 | Bhaskaran et al. |
| 2023/0049843 | A1 | 2/2023 | Mishra et al. |
| 2023/0179640 | A1 | 6/2023 | Qiao |
| 2023/0239027 | A1 | 7/2023 | Girycki |
| 2023/0269612 | A1 | 8/2023 | Muruganathan |
| 2023/0291450 | A1 | 9/2023 | Su |
| 2023/0308853 | A1* | 9/2023 | Ding ...................... H04W 4/40 |
| 2024/0007886 | A1* | 1/2024 | Xu ..................... H04L 43/0852 |
| 2025/0016631 | A1* | 1/2025 | Sun .................. H04W 36/0033 |

FOREIGN PATENT DOCUMENTS

| | | | | |
|---|---|---|---|---|
| CN | 103404197 | | 11/2013 | |
| EP | 2849524 | | 3/2017 | |
| EP | 3531775 | | 8/2019 | |
| KR | 1020090044008 | A | 5/2009 | |
| KR | 101101722 | | 1/2012 | |
| KR | 20160028970 | | 3/2016 | |
| WO | WO-2018202129 | A1 * | 11/2018 | ........ H04W 28/0252 |
| WO | WO-2019137121 | A1 * | 7/2019 | ............ H04W 88/08 |
| WO | WO-2023164617 | A1 * | 8/2023 | ............ H04W 28/08 |

OTHER PUBLICATIONS

International Searching Authority; International Search Repot and Written Opinion; International Application No. PCT/US2023/060952; May 10, 2023; 14 pgs.

3GPP; TSG RAN; NG-RAN; Architecture description (Release 17); 3GPP TS 38.401 V17.5.0, Jun. 29, 2023; sections 6.1.1.1, 8.2.1.1; and figures 6.1-1, 8.2.1.1-1.

International Searching Authority; International Search Report and Written Opinion; International Application No. PCT/US2024/045099; Feb. 9, 2025; 13 pgs.

O-RAN Working Group 1 (Use Cases and Overall Architecture) O-RAN Architecture Description, ORAN. WG1.OAD-R003-v10.00, Jul. 27, 2023; pp. 8-23; Fig 5.1-2.

3GPP; 3rd Generation Partnership Project; Technical Specification Group Radio Access Network; Coordinated multi-point operation for LTE physical layer aspects (Release 11); 3GPP TR 36.819 V11.1.0; Dec. 2011; 69 pages.

A. Khalili, S. Akhlaghi, H. Tabassum and D. W. K. Ng, "Joint User Association and Resource Allocation in the Uplink of Heterogeneous Networks," in IEEE Wireless Communications Letters. doi: 10.1109/LWC.2020.2970696.

Adamuz-Hinojosa, Oscar, et al. "Sharing gNB components in RAN slicing: a perspective from 3GPP/NFV standards." 2019 IEEE Conference on Standards for Communications and Networking (CSCN). IEEE, 2019.

Alba, Alberto Martinez, et al. "A realistic coordinated scheduling scheme for the next-generation RAN." 2018 IEEE Global Communications Conference (GLOBECOM). IEEE, 2018; 7 pages.

Alba, Alberto Martínez, Jorge Humberto Gómez Velásquez, and Wolfgang Kellerer. "An adaptive functional split in 5G networks." IEEE INFOCOM 2019—IEEE Conference on Computer Communications Workshops (INFOCOM WKSHPS). IEEE, 2019; 7 pages.

Björnson, et al. "Making cell-free massive MIMO competitive with MMSE processing and centralized implementation." IEEE Transactions on Wireless Communications 19.1 (2019): 77-90.

Boviz, Dora, et al. "Multi-cell coordination in cloud ran: Architecture and optimization." 2016 International Conference on Wireless Networks and Mobile Communications (WINCOM). IEEE, 2016.

Chen, Zengxian, et al. "Radio resource coordination and scheduling scheme in ultra-dense cloud-based small cell networks." EURASIP Journal on Wireless Communications and Networking 2018.1 (2018): 1-15.

Escudero-Garzas et al.; On the Feasibility of 5G Slice Resource Allocation With Spectral Efficiency: a Probabilistic Characterization; IEEEAccess; Oct. 2019; pp. 151948-151961; vol. 7, 17; DOI: 10.1109/ACCESS.2019.29479 A pp. 151948-151959.

Frank et al.; Cooperative Interference-Aware Joint Scheduling for the 3GPP LTE Uplink; 10.1109/PIMRC.2010.5671678; Oct. 2010; 6 pages.

Gerasimenko, et al.; Cooperative Radio Resource Management in Heterogeneous Cloud Radio Access Networks. IEEE Access; Apr. 13, 2015; vol. 3; pp. 397-406.

Gharsallah et al. "SDN/NFV-based handover management approach for ultradense 5G mobile networks." International Journal of Communication Systems 32.17 (2019): 15 pages.

H. U. Sokun, E. Bedeer, R. H. Gohary and H. Yanikomeroglu, "Fairness-oriented resource allocation for energy efficiency optimization in uplink OFDMA networks," 2018 IEEE Wireless Communications and Networking Conference (WCNC), Barcelona, 2018, pp. 1-6.

Hoang, T.D. and Le, L.B., 2017. Joint prioritized scheduling and resource allocation for OFDMA-based wireless networks. IEEE Transactions on Wireless Communications, 17(1), pp. 310-323.

Huang, Min, and Xu Zhang. "Distributed MAC Scheduling Scheme for C-RAN with Non-Ideal Fronthaul in 5G Networks." 2017 IEEE Wireless Communications and Networking Conference (WCNC). IEEE, 2017; 6 pages.

International Searching Authority; International Search Report and Written Opinion; International Application No. PCT/US2021/072609; Mar. 15, 2022; 8 pgs.

(56)                References Cited

OTHER PUBLICATIONS

International Searching Authority; International Search Report and Written Opinion; International Application No. PCT/US2021/073111; Apr. 21, 2022; 9 pgs.

Karimi, A., Pedersen, K.I. and Mogensen, P., Aug. 2019. 5G URLLC performance analysis of dynamic-point selection multi-user resource allocation. In 2019 16th International Symposium on Wireless Communication Systems (ISWCS) (pp. 379-383). IEEE.

Karimi, Ali, et al. "5G centralized multi-cell scheduling for URLLC: Algorithms and system-level performance." IEEE Access 6 (2018): 72253-72262.

Karimi, Ali, et al. "Centralized joint cell selection and scheduling for improved URLLC performance." 2018 IEEE 29th Annual International Symposium on Personal, Indoor and Mobile Radio Communications (PIMRC). IEEE, 2018; 6 pages.

Karimidehkordi, Ali. "Multi-Service Radio Resource Management for 5G Networks." (2019).

Le, N.T., Tran, L.N., Vu, Q.D. and Jayalath, D., 2019. Energy-efficient resource allocation for OFDMA heterogeneous networks. IEEE Transactions on Communications, 67(10), pp. 7043-7057.

Mehboob et al.; Genetic Algorithms in Wireless Networking: Techniques, Applications, and Issues; arXiv:1411.5323v1 [cs.NI]; Nov. 2014; 27 pgs.

Morancho et al. Coordination strategies for interference management in mimo dense cellular networks. Diss. Universitat Politècnica de Catalunya, 2017; 240 pgs.

Mwakwata, Collins Burton, et al. "Cooperative interference avoidance scheduler for radio resource management in nb-iot systems." 2020 European Conference on Networks and Communications (EuCNC). IEEE, 2020; pp. 154-159.

Ngo, Hien Quoc, et al. "Cell-free massive MIMO versus small cells." IEEE Transactions on Wireless Communications 16.3 (2017): 1834-1850.

Niu, Binglai, et al. "A dynamic resource sharing mechanism for cloud radio access networks." IEEE Transactions on Wireless Communications 15.12 (2016): 8325-8338.

Niu, Jinping, et al. "Multi-cell cooperative scheduling for uplink SC-FDMA systems." 2013 IEEE 24th Annual International Symposium on Personal, Indoor, and Mobile Radio Communications (PIMRC). IEEE, 2013; pp. 1582-1586.

O-RAN Alliance; O-RAN Working Group 1 Slicing Architecture; O-RAN.WG1.Slicing-Architecture-v03.00, Technical Specification, Nov. 2020; pp. 1-36 and figures A.1.2-1, 3.2.3-1.

O-Ran Alliance; O-Ran Working Group 1, Study on O-RAN Slicing; O-RAN.WG1.Study-on-O-RAN-Slicing-v02.00; Technical Specification; Apr. 2020; pp. 1-28.

Rahman, M.A.; Lee, Y.; Koo, I. Energy-Efficient Power Allocation and Relay Selection Schemes for Relay-Assisted D2D Communications in 5G Wireless Networks. Sensors 2018, 18, 2865.

Rahman, M.A.; Lee, Y.; Koo, I. Joint Relay Selection and Power Allocation through a Genetic Algorithm for Secure Cooperative Cognitive Radio Networks. Sensors 2018, 18, 3934.

Rodoshi, Rehenuma Tasnim, Taewoon Kim, and Wooyeol Choi. "Resource management in cloud radio access network: Conventional and new approaches." Sensors 20.9 (2020): 2708; 32 pages.

S. Pietrzyk and G. J. M. Janssen, "Cooperative Intra-cell Spectrum Reuse Method for OFDMA—based Multiple Access Systems," 2006 International Conference on Microwaves, Radar & Wireless Communications, Krakow, 2006, pp. 630-633, doi: 10.1109/MIKON.2006.4345258.

S. Pietrzyk and G. J. M. Janssen, "Multiuser subcarrier allocation for QoS provision in the OFDMA systems," Proceedings IEEE 56th Vehicular Technology Conference, Vancouver, BC, Canada, 2002, pp. 1077-1081 vol. 2, doi: 10.1109/VETECF.2002.1040769.

S. Pietrzyk, "OFDMA for Broadband Wireless Access," Artech House, 2006 - 250.

SAMSUNG; Network Slicing; Technical White Paper; Apr. 22, 2020; pp. 1-21.

Singh et al. "A survey on resource scheduling in cloud computing: Issues and challenges." Journal of grid computing 14.2 (2016): 217-264.

Sultan, R., Song, L., Seddik, K.G. and Han, Z., 2020. Joint resource management with distributed uplink power control in full-duplex OFDMA networks. IEEE Transactions on Vehicular Technology, 69(3), pp. 2850-2863.

Umesh et al.; Overview of O-RAN Fronthaul Specifications; NTT DOCOMO Technical Journal; Jul. 2019; pp. 46-59; vol. 21, No. 1.

W. K. Lai and J. Liu, "Cell Selection and Resource Allocation in LTE-Advanced Heterogeneous Networks," in IEEE Access, vol. 6, pp. 72978-72991, 2018.

Wei et al. "Multi-Cell Cooperative Scheduling for Network Utility Maximization With User Equipment Side Interference Cancellation." IEEE Transactions on Wireless Communications 17.1 (2017): 619-635.

Xu, Xiaodong, et al. A frameless network architecture for the way forward of C-RAN. China Communications 13.6 (2016): 154-166.

Xu, XiaoDong, et al. Resource pooling for frameless network architecture with adaptive resource allocation. Science China Information Sciences 56.2 (2013): 1-12.

Xu, Xiaodong, et al. SDN based next generation mobile network with service slicing and trials. China Communications 11.2 (2014): 65-77.

Y. Liu, X. Yang, I. C. Wong, Y. Wang and L. Cuthbert, "Evaluation of Game Theory for Centralized Resource Allocation in Multi-Cell Network Slicing," 2019 IEEE 30th Annual International Symposium on Personal, Indoor and Mobile Radio Communications (PIMRC), Istanbul, Turkey, 2019, pp. 1-6.

Yang, Mao, et al. "OpenRAN: a software-defined ran architecture via virtualization." ACM SIGCOMM computer communication review 43.4 (2013): 549-550.

Z. Lin and Y. Liu, "Joint Uplink-Downlink Resource Allocation in OFDMA Cloud Radio Access Networks," 2018 IEEE International Conference on Communications (ICC), Kansas City, MO, 2018, pp. 1-6.

Zhang, X., Chang, T.H., Liu, Y.F., Shen, C. and Zhu, G., 2019. Max-min fairness user scheduling and power allocation in full-duplex OFDMA systems. IEEE Transactions on Wireless Communications, 18(6), pp. 3078-3092.

Zhao, N., Liang, Y.C., Niyato, D., Pei, Y., Wu, M. and Jiang, Y., 2019. Deep reinforcement learning for user association and resource allocation in heterogeneous cellular networks. IEEE Transactions on Wireless Communications, 18(11), pp. 5141-5152.

* cited by examiner

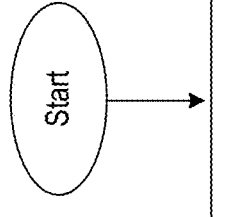

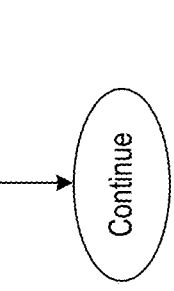

Start providing a plurality of capsules that operate in parallel to cooperatively perform RAN stack operations, each capsule utilizing a processor and a memory configured to perform a component of the RAN stack operations, wherein the RAN stack operations result in:

communicating backhaul communications with a core communication network;

communicating fronthaul communications with a plurality of radio units configured to engage in wireless communications with a plurality of user equipment (UEs) via a radio channel of a radio network;

converting, in accordance with a communication standard, received fronthaul communications from the plurality of radio units into backhaul communications transmitted to the communications network; and converting, in accordance with the communication standard, received backhaul communications from the communications network into fronthaul communications transmitted to the plurality of radio units Continue

FLEXIBLE SOFTWARE-DEFINED RADIO ACCESS NETWORK ARCHITECTURE AND METHODS FOR USE THEREWITH

CROSS-REFERENCE TO RELATED APPLICATIONS

The present U.S. Utility Patent application claims priority pursuant to 35 U.S.C. § 119 (e) to U.S. Provisional Application No. 63/581,363, entitled "FLEXIBLE SOFTWARE-DEFINED RADIO ACCESS NETWORK ARCHITECTURE AND METHODS FOR USE THEREWITH", filed Sep. 8, 2023, which is hereby incorporated herein by reference in its entirety and made part of the present U.S. Utility Patent Application for all purposes.

FIELD OF THE DISCLOSURE

The subject disclosure relates to implementation and control of wireless communication networks.

BRIEF DESCRIPTION OF THE DRAWINGS

Reference will now be made to the accompanying drawings, which are not necessarily drawn to scale, and wherein:

FIG. 1B is a flow diagram illustrating a non-limiting example of a method in accordance with various aspects described herein.

DETAILED DESCRIPTION

Figure 1A:
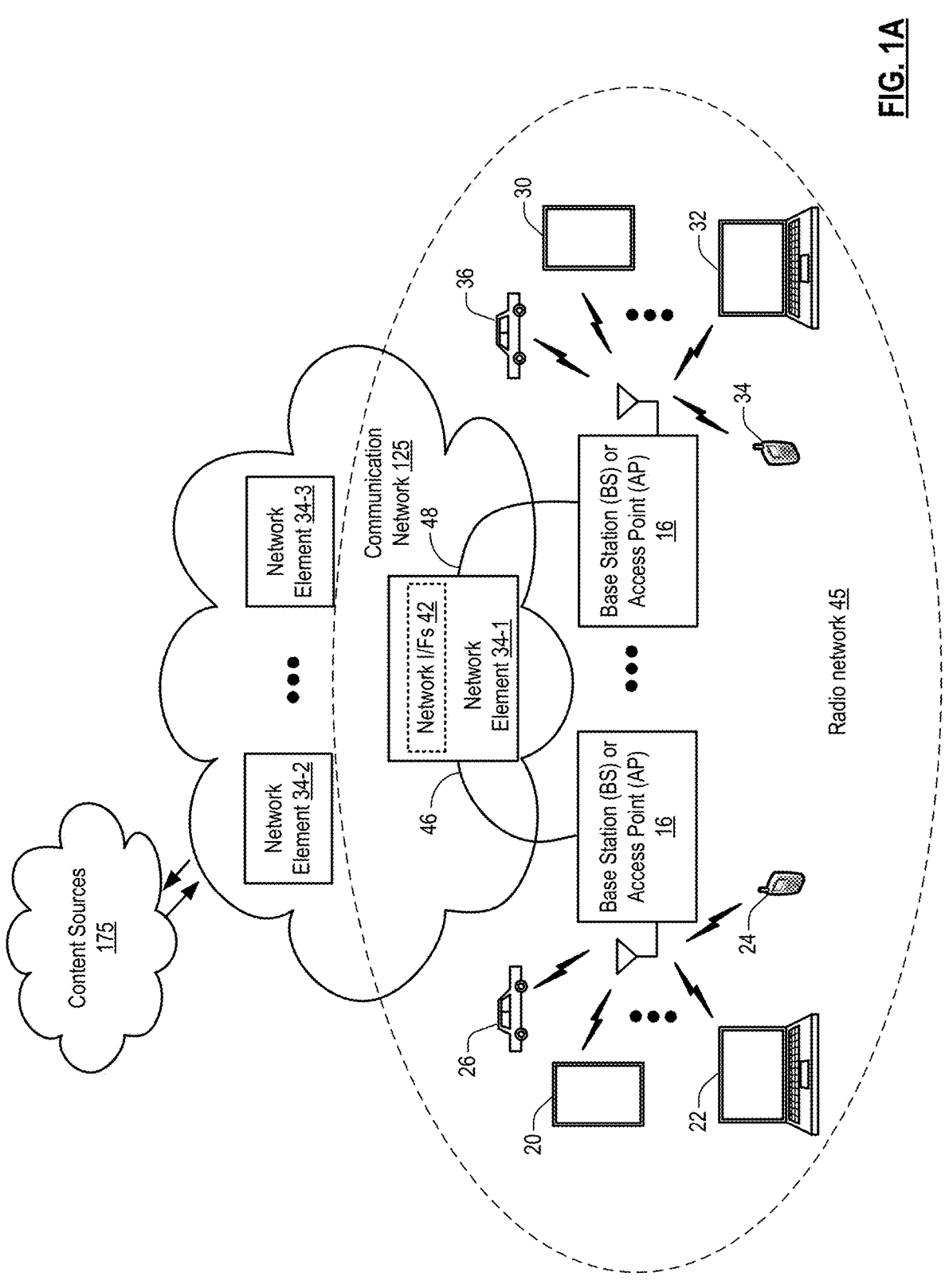
FIG. 1A is a schematic/block diagram illustrating a non-limiting example of a communications network in accordance with various aspects described herein.

One or more examples/embodiments are now described with reference to the drawings, wherein like reference numerals are used to refer to like elements throughout. In the following description, for purposes of explanation, numerous details are set forth in order to provide a thorough understanding of the various examples. It is evident, however, that the various examples can be practiced without these details (and without applying to any particular networked environment or standard).

Referring now to FIG. 1, a schematic/block diagram is shown illustrating an example, non-limiting example of a communications network 125, such as a core communications network or other wide area network in accordance with various aspects described herein. In particular, the communications network 125 includes a plurality of network elements 34, such as network elements 34-1, 34-2 and 34-3 that are shown.

In various examples, the network elements 34 are interconnected via transport links that can be wired, optical and/or wireless links that, for example, support encapsulated and encrypted transport. The network elements 34 can be implemented, for example, with the use of radio access network (RAN) controllers, RAN intelligent controllers (RIC) either non-real time, near real time or real time, programmable switches, edge servers, soft switches, network gateways, media distribution hubs, and/or other routers, edge devices, switches or network nodes and combinations thereof that themselves can be implemented via special purpose hardware, and/or via general purpose hardware computing programmed to perform their respective functions.

The communications network 125 operates to support communications including communications via the radio access network 45. In operation, the communication network 125 transports data received from content sources 175 or other data content transport clients, and/or data conveying other communications between wireless communication devices. This data can include, e.g., audio, video, graphics, text or other media, applications control information, billing information, network management information and/or other data. The core communication network 125 also operates to manage access by the wireless communication devices, provides billing and network management and supports other network functions.

The wireless communication devices include tablets 20 and 30, laptops 22 and 32, mobile phones 24 and 34, vehicles 26 and 36 and/or other fixed or mobile communication devices. The wireless communications can include signals formatted in accordance with 3GPP, long term evolution (LTE) 4G, 5G, other orthogonal frequency division multiple access (OFDMA) protocols and/or other wireless signaling. These wireless communications devices can be referred to as client devices or user equipment (UEs), regardless of the particular standard used to communicate with these particular devices.

The wireless communication devices communicate with base station or access points 16 to receive services from the communication network 125. Typically, base stations are used for cellular telephone systems and like-type systems, while access points are typically used for in-home or in-building wireless networks. For direct connections (i.e., point-to-point communications), wireless communication devices communicate directly with the BS or AP 16 via an allocated channel, time slot and/or other physical resource block (PRB) of a radio channel serviced by a plurality of radio units (RUs) that operate in conjunction with baseband processing to convert communications from the communications network 125 into wireless communications of the radio access network 45 and vice versa. Regardless of the particular type of communication system, each wireless communication device also includes, or is coupled to, a corresponding radio configured for wireless communications via the radio access network 45.

In the example shown, the network element 34-1 includes an edge server, radio access network intelligent controller and/or other network element or elements having a plurality of network interfaces (I/Fs) 42. The plurality of network interfaces (I/Fs) 42 can include a wide area network interface for operating over one or more backhaul links with other network elements 34 operating to support data transport. In addition, the network interfaces (I/Fs) 42 can support communications with other network elements 34 operating other portions of the radio access network 45. The plurality of network interfaces 42 can further support a plurality of other links 46 and 48, for upstream and downstream communication with a plurality of wireless communications devices over the radio access network 45 via base station (BS) or access points (AP) 16. For example, the network interfaces 42 can include a core network interface configured to communicate network communications with one or more network elements 34 of a core communication network, and a radio network interface configured to communicate communications BS or APs 16 of the radio access network 45. These interfaces 42 can operate via F1, E2, evolved packet core (EPC), next generation core (NGC), 5G core or via another network protocol or standard. The network element 34-1 can also include a cooperative radio resource manager or other radio resource manager that operates to support resource management of the radio access network 45 including load control and power control, and/or admission control, packet scheduling, hand-over control, and/or other user plane and control plane functions of a radio network controller/radio access network intelligent controller, etc.

In addition or in the alternative, the network element 34-1 and BS or AP 16 can be implemented in conjunction with an open radio access network (O-RAN) or other standard that is based on interoperability and standardization of RAN elements and includes a unified interconnection standard for white-box hardware and open source software elements from different vendors to provide an architecture that integrates a modular base station software stack on off-the-shelf hardware which allows baseband and radio unit components from discrete suppliers to operate seamlessly together. For example, the network element 34-1 can include a packet processing function (PPF) which contains user-plane functions that are asynchronous to the Hybrid Automatic Repeat Request (HARQ) loop, and includes the Packet Data Convergence Protocol (PDCP) layer—such as encryption—and the multipath handling function for the dual connectivity anchor point and data scheduling and/or a radio control function (RCF) that handles load sharing among system areas and different radio technologies, as well as the use of policies to control the schedulers in the RPFs and PPFs. At the user and bearer level, the RCF can, for example, operate to negotiate QoS and other policies with other domains and is responsible for the associated service level agreement (SLA) enforcement in the RAN and/or to control the overall RAN performance relative to the service requirement, creates and manages analytics data, and the RAN self-organizing network (SON) functions.

While the BS or APs 16 are shown schematically as if having a single antenna, the BS or APs 16 each include a plurality of RUs (each with one or more antennas) that are supported by baseband processing via a combination of distributed units (DU) and centralized units (CU). In various examples, CUs, DUs and RUs communicate control plane and user plane signaling from the UEs to the core network. The CUs/DUs/RUs operate in conjunction with a radio access network protocol stack (that can be called more simply a "RAN stack" or "radio stack") that can include, for example, a physical (PHY) layer, media access control (MAC) layer, radio link control (RLC) layer and one or more upper layers such as a Packet Data Convergence Protocol (PDCP) layer and/or a service data adaptation protocol (SDAP) layer, and/or other layers, etc. that also can be referred to as RAN stack components.

The network element 34-1 and BS or AP 16 can cooperate and operate in an architecture where the baseband processing via the DU/CU combination supports a plurality of RUs with, for example, multiple DUs attaching to a single CU and/or multiple RUs attaching to single DU. In particular, a flexible SD-RAN software (SW) architecture is implemented via or in conjunction with one or more RUs/DUs/CUs in the BS or AP 16 or the network element 34-1. Base station elements, including the DUs and CUs can be collocated in a BS or AP 16 with multiple RUs-but they do not have to be collocated. In addition or in the alternative, the CU alone or the CUs and DUs can be implemented in network element 34-1. In this case, element 34-1 can include a combination of 1:N DUs and/or 1 or more CUs with, for example, a single DU aggregating multiple RUs and/or a single CU aggregating multiple DUs.

The current disclosure is reflective of future networking infrastructure which can largely rely on the resources in the edge-cloud continuum. Existing deployments (e.g. based on the O-RAN Alliance specifications) may already be enabled by the virtualization of radio stacks. The forecasts and the currently operational networks clearly show that the more traffic will be processed closer to the users in the next few years due to, for example, real-time IoT applications. Moreover, the user traffic growth is undergoing a trend of an exponential increase and it applies to access networks, but is especially challenging in wireless systems.

In order to sustain the growing traffic demand and supply the well-matched capacity in wireless access, there are few options known: a) acquiring more spectrum-which is the key resource to deliver the future traffic volumes, b) improving the spectral efficiency of the existing communication technologies and c) densifying access points (e.g. radio units) without amending the spectrum.

This first option of bringing more spectrum is feasible most easily only at the beyond 6 GHz bands, where there is a vast amount of frequency resources. However, the disadvantage is the resulting networks rely on much shorter wavelengths and thus are also more prone to mobility artifacts and environmental obstacles. On the contrary, the mid-bands (below 6 GHZ) are already crowded. The recent reports show that an order of additional 1000 Mhz per mobile operator would need to be available in major cities (with up to 8-18 k people/sq km) by ca. 2030, in order to assure the expected capacity growth. But the existing macro access points (AP) infrastructure, has not much room for extension of the current cells deployment locations. Also access to such an amount of spectrum is extremely hard without essential refarming.

Secondly, improving the spectral efficiency is feasible with a multitude of techniques like e.g. NOMA, RSMA, mMIMO, beamforming, interference mitigation and cancellation, etc. However, the foundations of these technologies aim at removing the interference resulting from a legacy cellular approach to resource management in the cellular networks-which is so called competitive RRM. In this approach, each AP allocates resources selfishly, i.e. without maximizing global optimum for the whole network, instead focusing on just a local optima. Such operational foundations lead to interference itself. Improving the existing situation without upgrading the philosophy (paradigm) itself might not be an efficient or even appropriate solution for extending networks' capacity. Instead, the cooperative RRM approach with well aligned controls that cooperate among cells is the virtue that enables the resolution of the incorrect foundations of the existing cellular wireless systems (e.g. 4G, 5G).

In order to increase capacity of the future networks, the number of antennas (radio units) may be increased by adding additional "underlay" small-cell networks that can coexist with the current macro AP topologies (or be built as standalone systems). The use of such complementary infrastructure removes the need to chase the new spectrum bands. New spectrum bands can still be acquired but the mmWaves and higher frequencies should mainly be used with the focus on the indoor locations due to more control over the radio environment there.

The densification of the access points and their ubiquity benefits from moving RAN components closer towards the Edge. This is understood not only as computing resources provisioned by telco vendors or operators but also as shared computing infrastructure are designed to serve many applications coming from multiple vendors. Such Edge computing infrastructure available to the next generation software will likely be distributed and shared. In addition, computing resources will be volatile to some extent. Some resources will be spawned, some will be detached from the network, others will be simply busy at the moment with existing workloads. At the same time, it is expected that there will be a significant emphasis on the cost and energy efficiency of the software. Moreover, the multitude of Edge applications, including those residing at the end user side, will benefit from fine-tuning of the base station itself. Therefore, future Radio Access Networks will have to be highly flexible-in respect to the instantaneous availability of the computing resources but also the application requirements. To achieve highly robust and scalable radio stacks in RAN, a special designs for the underlying SW architecture are desirable.

Existing SW architecture paradigms include, among others a popular microservice architecture where an application is divided into small, independent services which through the mutual interactions form a working software. Software built in this approach is easily manageable. However, this design is aimed at Web applications where the delay constraints in communication between software components are relaxed. Therefore, applying legacy microservice architecture to RAN designs would result in failing stringent delay requirements. On the other hand, there are monolithic solutions which, due to their architecture, provide a tailored design ensuring e.g. efficient communication and resource utilization. The drawback of this approach is, however, its inflexibility in terms of adoption into the changing computing infrastructure but also inherent incapability to efficiently manage the development and maintenance of the software itself.

In particular, a flexible SW architecture that can be used in SW defined RAN and/or other configurations is disclosed herein in various embodiments, examples and/or combinations-one or more of which provide the following advantages and/or improvements over traditional designs.

An architectural design for delivering highly-adaptable deployment structure, for real-time radio stack (that includes capsules, modules, liquidity controller and/or interfaces/adapters);
specific adapters/muxes (to assure seamless communication between modules);

a message exchange protocol that is independent of inter-capsule interfaces;
an adaptable internal architecture that can repurpose itself and adjust its composition from a monolith (single module, single process, single machine) to highly-decomposed solution (distributed modules, distributed capsules, multiple nodes);
a design that supports a distributed RAN's protocol layer cooperation (e.g., cooperative scheduling);
a design that is suited to edge-cloud deployments and is capable of on-demand, online scaling;
a design that supports polymorphism of modules at run-time (module composition can be changed without engaging of the external orchestrator);
a Liquidity Controller (LC) that enables high degree of distribution for radio stacks
a design that can be applied also in non-RAN applications where the real-time, flexibility and adaptability of SW components are available
universal role of capsules for realtime communications (e.g., managed by an external operating system thread or other mechanism).

Various examples and/or embodiments present a very pragmatic perspective of building blocks for a successful design of the RAN stacks, which meets the requirements of the future networks (e.g. IMT-2030). The SW components and the architectural foundations, described herein are the key building blocks that, on one hand, fit into the generic concept of service based architecture, but at the same time provide operational optimization of the monolith solution. One or more of these examples and/or embodiments facilitate:

building a scalable, flexible, robust and real-time radio stacks to form 5G and next generation networks,
deploying radio stack for 5G and beyond, to suite the multiple solutions for the edge-cloud continuum,
enabling the seamless functional splits for 5G (and beyond) network designs—i.e. the 3GPP functional splits should be considered as sample of the overarching set of options,
modifying the deployment of radio stack components (e.g. DU, CU, RU) prior or during operation of the stack without breaking the RAN function execution,
supporting cooperation between stack instances (and selected protocols) at various levels of the stack layers (e.g. direct cooperation between a number of stack instances), leading to support of multiple future updates and modernizations of RAN deployments (e.g. mesh, cell-free, etc.).

The above mentioned features can be facilitated by optimized SW-design concepts of the radio stack, which allow a future radio stack to be fully portable, custom-based disaggregated and to an extent "fluid" with regards to the capability to adjust to resources available in the computing space.

Various examples and/or embodiments involve blocks for RAN stacks, among others, that provide suitability for situations where the computing resources in the edge undergo dynamic changes due to the emerging nature of the new applications that may rely more heavily on the support from AI/ML algorithms, might consume resources intensively, and can vary the amount of resources that might be expected. Various examples and/or embodiments allow compliant RAN networks to be ultra-flexible in where, when and how they are deployed and furthermore are compatible with dense deployments, the efficient use of computing resources, combined with the necessary access network architecture upgrades (e.g. cell-free) and efficient algorithms that support cooperative RRM, and can address the high expectations of future networks (e.g. 6G).

Various examples and/or embodiments involve a system and/or method for use with a radio access network having a plurality of capsules that operate in parallel to cooperatively perform RAN stack operations, each capsule utilizing a processor and a memory configured to perform a corresponding component of the RAN stack operations. The RAN stack operations can result in:

communicating backhaul communications with a core communication network;
communicating fronthaul communications with a plurality of radio units configured to engage in wireless communications with a plurality of user equipment (UEs) via a radio channel of a radio network;
converting, in accordance with a communication standard, received fronthaul communications from the plurality of radio units into backhaul communications transmitted to the communications network; and
converting, in accordance with the communication standard, received backhaul communications from the communications network into fronthaul communications transmitted to the plurality of radio units.

In addition or in the alternative to any of the foregoing, the operations further include: generating a UE to PRB to RU allocation that associates ones of a plurality of PRBs to selected ones of the plurality of UEs and selected ones of a plurality of RUs.

In addition or in the alternative to any of the foregoing, the corresponding components of the RAN stack operations performed by two or more plurality of capsules is implemented via a single thread.

In addition or in the alternative to any of the foregoing, a first subset of capsules is implemented by a first module under control of a first liquidity controller, wherein a second subset of capsules is implemented by a second module under control of a second liquidity controller, and wherein the first subset of capsules are mutually exclusive of the second subset of capsules.

In addition or in the alternative to any of the foregoing, the first liquidity controller controls life cycle management tasks of the first subset of capsules and the second liquidity controller controls life cycle management tasks of the second subset of capsules.

In addition or in the alternative to any of the foregoing, the first liquidity controller is configured to selectively add a new capsule to the first subset of capsules and wherein the first liquidity controller is further configured to selectively remove an existing capsule from the first subset of capsules.

In addition or in the alternative to any of the foregoing, multiplexers in the first module and the second module support logical links between two or more of the first subset of capsules and two or more of the second subset of capsules.

In addition or in the alternative to any of the foregoing, at least one first capsule of the first subset of capsules communicates directly with at least one second capsule of the second subset of capsules.

In addition or in the alternative to any of the foregoing, the first liquidity controller and the second liquidity controller cooperate to support migration of a first capsule from the first subset of capsules to the second subset of capsules.

In addition or in the alternative to any of the foregoing, the migration includes: recreating the first capsule as a new first capsule in the second module; moving a context to the new first capsule in the second module; and removing the first capsule from the first module.

In addition or in the alternative to any of the foregoing, the migration is performed during stack run-time.

In addition or in the alternative to any of the foregoing, the migration is triggered by a fault.

In addition or in the alternative to any of the foregoing, the migration is performed as part of a fault prevention.

In addition or in the alternative to any of the foregoing, the migration is performed as part of a security mechanism in response to a security attack on the RAN.

In addition or in the alternative to any of the foregoing, the plurality of capsules include a detection capsule configured to monitor network traffic and/or system hardware and to detect the security attack.

In addition or in the alternative to any of the foregoing, the plurality of capsules further include a mitigation capsule configured to mitigate the security attack via one or more protective actions.

In addition or in the alternative to any of the foregoing, a liquidity controller controls life cycle management tasks of the first subset of capsules.

In addition or in the alternative to any of the foregoing, the liquidity controller is configured to selectively add a new capsule to the first subset of capsules and wherein the liquidity controller is further configured to selectively remove an existing capsule from the first subset of capsules.

In addition or in the alternative to any of the foregoing, the plurality of capsules are configured to support slicing functionality to separately process different types of signals or different types of data corresponding to differing applications, wherein the differing applications include: 5G, a media streaming, and/or a gaming.

In addition or in the alternative to any of the foregoing, the plurality of capsules perform RAN stack operations corresponding to a plurality of RAN stacks.

In addition or in the alternative to any of the foregoing, the RAN includes a plurality if RUs, a subset of the plurality of capsules support cooperative scheduling across the plurality of RAN stacks.

In addition or in the alternative to any of the foregoing, the cooperative scheduling includes generating a UE to PRB to RU allocation that associates ones of a plurality of PRBs to selected ones of the plurality of UEs and selected ones of the plurality of RUs.

Further details regarding the operation of the flexible SD-RAN SW architecture, including several alternatives and optional functions and/or features, are presented in conjunction with the discussion that follows.

FIG. 1B is a flow diagram 101 illustrating a non-limiting example of a method in accordance with various aspects described herein. In particular, a method is presented for use in conjunction with any of the example architectures, examples, and/or embodiments described previously or in the sections that follow. The method includes providing a plurality of capsules that operate in parallel to cooperatively perform RAN stack operations, each capsule utilizing a processor and a memory configured to perform a component of the RAN stack operations, wherein the RAN stack operations result in: communicating backhaul communications with a core communication network; communicating fronthaul communications with a plurality of radio units configured to engage in wireless communications with a plurality of user equipment (UEs) via a radio channel of a radio network; converting, in accordance with a communication standard, received fronthaul communications from the plurality of radio units into backhaul communications transmitted to the communications network; and converting, in accordance with the communication standard, received backhaul communications from the communications network into fronthaul communications transmitted to the plurality of radio units.

In addition or in the alternative to any of the foregoing, the operations further include: generating a UE to PRB to RU allocation that associates ones of a plurality of PRBs to selected ones of the plurality of UEs and selected ones of a plurality of RUs.

In addition or in the alternative to any of the foregoing, the corresponding components of the RAN stack operations performed by two or more plurality of capsules is implemented via a single thread.

In addition or in the alternative to any of the foregoing, a first subset of capsules is implemented by a first module under control of a first liquidity controller, wherein a second subset of capsules is implemented by a second module under control of a second liquidity controller, and wherein the first subset of capsules are mutually exclusive of the second subset of capsules.

In addition or in the alternative to any of the foregoing, the first liquidity controller controls life cycle management tasks of the first subset of capsules and the second liquidity controller controls life cycle management tasks of the second subset of capsules.

In addition or in the alternative to any of the foregoing, the first liquidity controller is configured to selectively add a new capsule to the first subset of capsules and wherein the first liquidity controller is further configured to selectively remove an existing capsule from the first subset of capsules.

In addition or in the alternative to any of the foregoing, multiplexers in the first module and the second module support logical links between two or more of the first subset of capsules and two or more of the second subset of capsules.

In addition or in the alternative to any of the foregoing, at least one first capsule of the first subset of capsules communicates directly with at least one second capsule of the second subset of capsules.

In addition or in the alternative to any of the foregoing, the first liquidity controller and the second liquidity controller cooperate to support migration of a first capsule from the first subset of capsules to the second subset of capsules.

In addition or in the alternative to any of the foregoing, the migration includes: recreating the first capsule as a new first capsule in the second module; moving a context to the new first capsule in the second module; and removing the first capsule from the first module.

In addition or in the alternative to any of the foregoing, the migration is performed during stack run-time.

In addition or in the alternative to any of the foregoing, the migration is triggered by a fault.

In addition or in the alternative to any of the foregoing, the migration is performed as part of a fault prevention.

In addition or in the alternative to any of the foregoing, the migration is performed as part of a security mechanism in response to a security attack on the RAN.

In addition or in the alternative to any of the foregoing, the plurality of capsules include a detection capsule configured to monitor network traffic and/or system hardware and to detect the security attack.

In addition or in the alternative to any of the foregoing, the plurality of capsules further include a mitigation capsule configured to mitigate the security attack via one or more protective actions.

In addition or in the alternative to any of the foregoing, a liquidity controller controls life cycle management tasks of the first subset of capsules.

In addition or in the alternative to any of the foregoing, the liquidity controller is configured to selectively add a new capsule to the first subset of capsules and wherein the liquidity controller is further configured to selectively remove an existing capsule from the first subset of capsules.

In addition or in the alternative to any of the foregoing, the plurality of capsules are configured to support slicing functionality to separately process different types of signals or different types of data corresponding to differing applications, wherein the differing applications include: 5G, a media streaming, and/or a gaming.

In addition or in the alternative to any of the foregoing, the plurality of capsules perform RAN stack operations corresponding to a plurality of RAN stacks.

In addition or in the alternative to any of the foregoing, the RAN includes a plurality if RUs, a subset of the plurality of capsules support cooperative scheduling across the plurality of RAN stacks.

In addition or in the alternative to any of the foregoing, the cooperative scheduling includes generating a UE to PRB to RU allocation that associates ones of a plurality of PRBs to selected ones of the plurality of UEs and selected ones of the plurality of RUs.

Figure 1C:
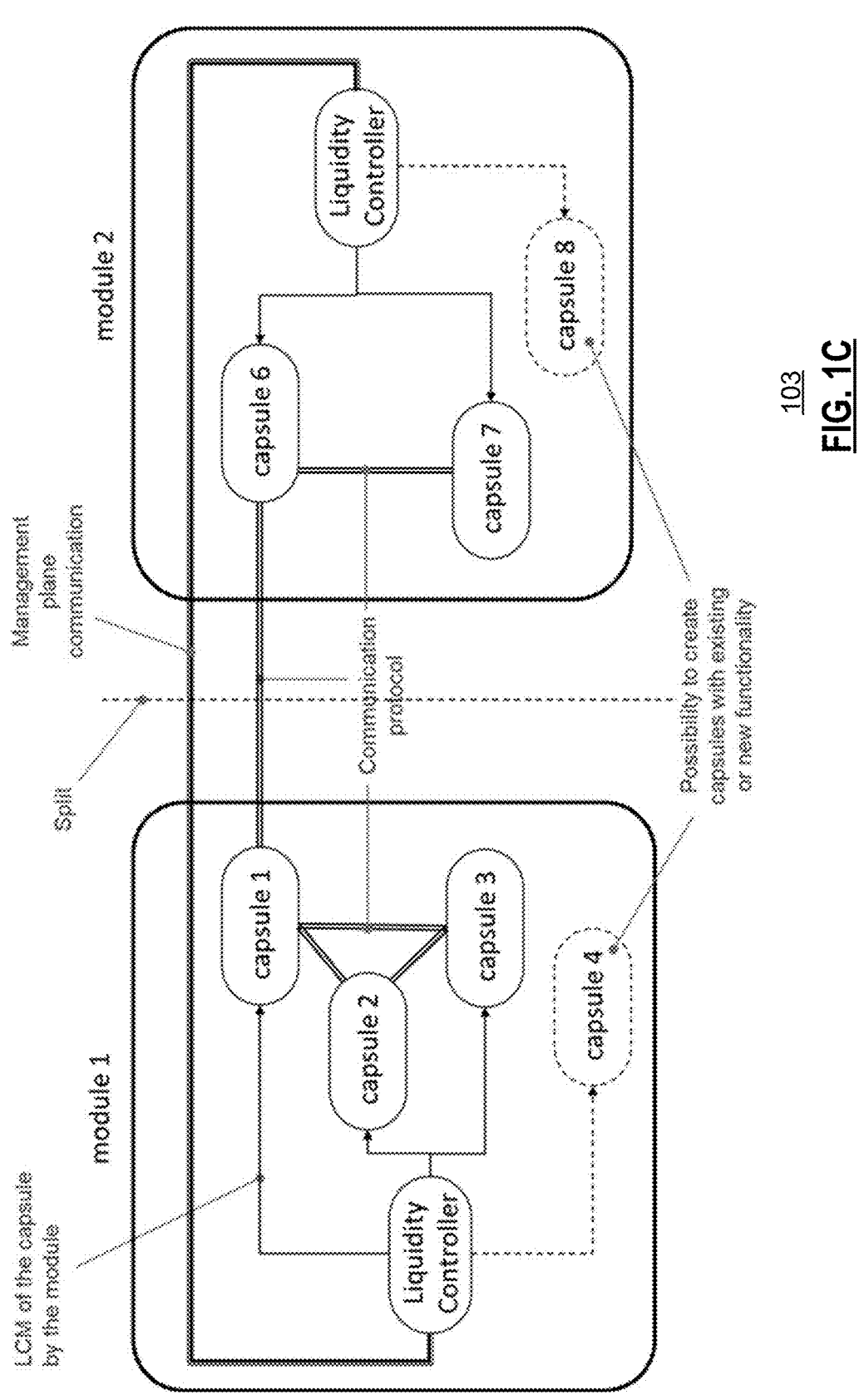
FIG. 1C is a schematic/flow diagram illustrating a non-limiting example of an architecture in accordance with various aspects described herein.

FIG. 1C is a schematic/flow diagram 103 illustrating a non-limiting example of an architecture in accordance with various aspects described herein. An example SW architecture is presented where the overall RAN stack is divided into small functionality chunks called capsules. In various examples and/or embodiments, these capsules can have one or more of the following characteristics a. Granularity of capsules can be arbitrary.

b. Capsules can be configured in the arbitrary way given the configuration options available for a given capsule, c. Capsule specifies protocols it can use to communicate with other capsules for both—the internal and external communication variants. In the internal communication variant capsules communicate with each other within a module (see next section) while external communication variant capsules communicate across modules (e.g. residing on different hosts). Internal communication can take benefits of fast in-process communication (e.g. shared memory) while external communication can take form of any communication protocol, d. Capsules communicate via bi-directional ports and the means for communication in the capsule-to-capsule relation are defined ad-hoc (at UML level) by a port's protocol model e. The following parameters are determined/optimized for each capsule: data object, number of ports, protocols used for communication outside the capsule f. Capsule receives data objects, conforming to the port protocols, processes the data and (optionally) sends data objects, again, conforming to the port protocols.

g. Number of capsules can be related to the context of its operation (e.g. user terminal context). Such context can be subject to exchange between capsules residing in the same or different modules or host machines, h. Some capsules can be created per UE, bearer or slice (e.g. PDCP protocol layer) while others can be common for the entire stack instance (MAC protocol layer), and i. Capsules can be stateful, i.e. their operations are tightly coupled with the context, or stateless, i.e. their operations are decoupled with the context.

Figure 2:
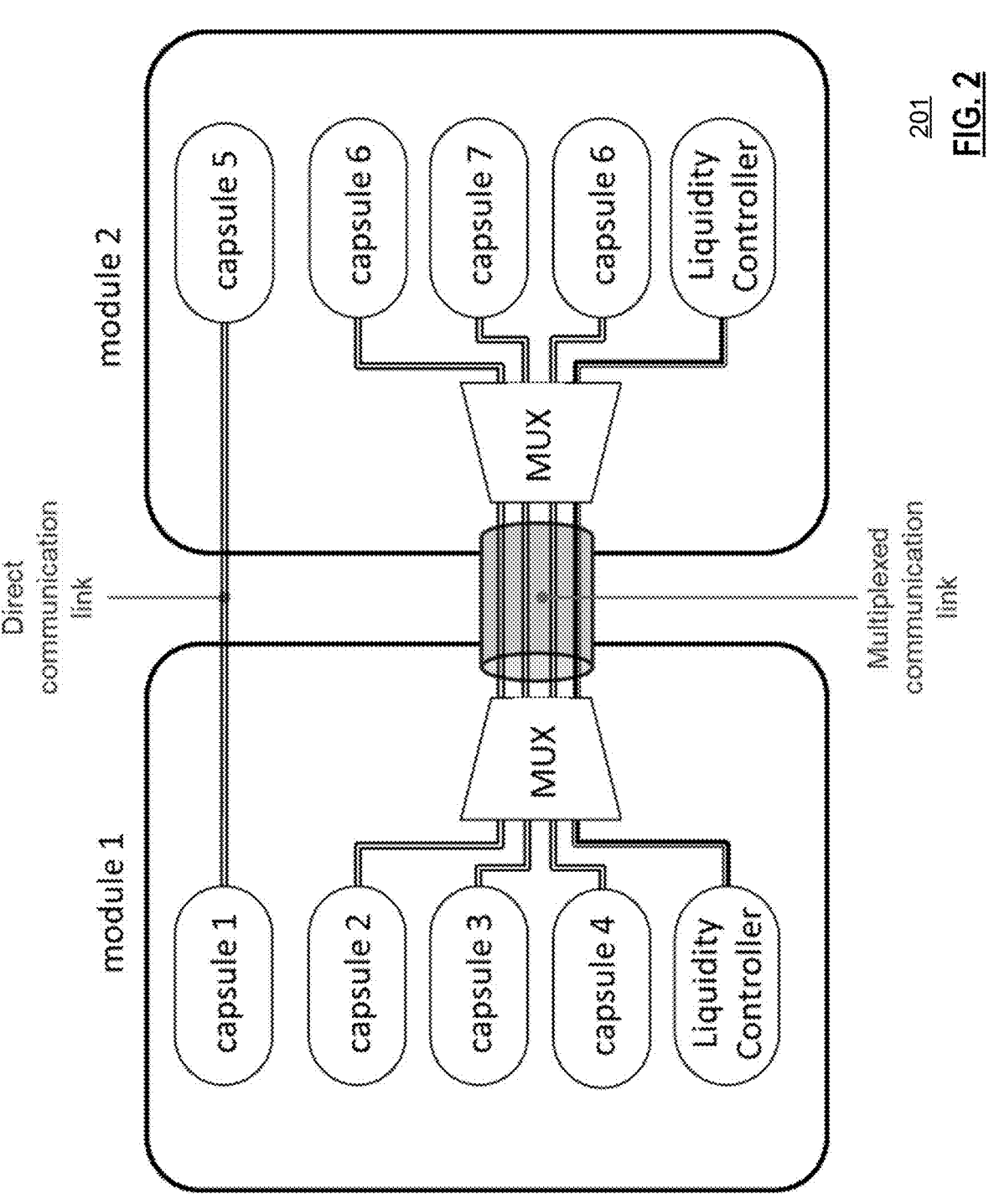
FIG. 2 is a schematic/block diagram 201 illustrating a non-limiting example of communication between modules in accordance with various aspects described herein.

In various examples and/or embodiments, these capsules can be grouped together into entities called modules. In various examples and/or embodiments, modules can represent a service understood as independently deployable, loosely coupled, possibly fine grained software function. Modules can have one or more of the following capabilities:

a. A module can contain as little as one capsule or as many as all capsules into which particular software (e.g. radio stack) can be decomposed, b. Modules control the life-cycle management (LCM) of all the capsules they contain (creating, configuring, running, reconfiguring, stopping and rerunning capsule instances) through a controller called a LC (Liquidity Controller), c. The information or context needed for the LC to make particular action can come from multiple sources, e.g.: capsules, other LCs (from different modules), but also other, external sources of information or context, d. LCs can communicate with each other via management plane communication which can be centralized or decentralized, e. LC itself can be considered as a capsule, f. LC enables standalone decision making related to dynamic adaptations of a module, without the need for interactions with the standard-based orchestrators (e.g. ETSI NFV), although, LC could naturally be considered as a main connection point for the external orchestrator, based on either (a) ETSI MANO architecture or alternatively (b) any container based architecture, e.g. Kubernetes, if the need arises to combine RAN stack adaptation and computing infrastructure management, g. A module is capable of spawning and/or removing any capsule on demand, at run-time, it is a so-called module polymorphism. It is done through LC, h. Modules, through the management plane communication of LC, are able to exchange user context. Together with point c) it enables capsule migration capability, i. The communication between capsules across modules can be aggregated and serialized (resembling a multiplexer or MUX function) to simplify the cross-module communication (see e.g., FIG. 2). An example use of such an approach could be the control plane communication, j. Two communicating modules implement a RAN split. Split options can be defined beyond the traditional approach: vertical (e.g. DU-CU) or horizontal (CU-UP-CU-CP), or a combination of both (e.g. diagonal). Split design is only limited by the granularity of the capsules, k. Connected modules together form a fully functional RAN protocol stack, l. The module can be virtualized in a form of e.g. a virtual machine or a container.

In various examples and/or embodiments, adoption of the system of capsules in the construction and design of RAN stack enables the use of the following advantages:

Capsules support parallelism—the programming and testing activities can be optimized by reducing time for integration and speeding up the development/testing. In addition, with the parallelism of program execution, the RAN stack can utilize the CPU multithreading capability (coming from multiple cores per CPU) and hence utilize the proliferating multicore architectures, Possibility to optimize the communication between capsules depending on the goals (e.g. URLLC) or deployment. E.g. capsules inside modules can use fast communication based on shared memory while communication between capsules across modules can take the form of any standard communication protocol, Capsules contain and process data inside, they allow splitting processing easily between UL/DL, allow for scaling and provide safe operation, Capsules expose message processing routines to the LC, which dynamically manages the actual processing within execution threads, With capsules, parallelization of the processing inside stack becomes easily achievable when enhanced with additional enablers, When aligned with the thread assigning mechanisms for the data transfer in DL and UL which provides a single thread (separately for DL and UL) to process functionalities of capsules in data-oriented manner (e.g. one thread per capsule group handling an incoming message), they can assure almost zero-cost of processing data inside RAN protocol stack. Data-oriented thread assignment mechanism built with the use of the capsule concept enables CPU optimization for different latency demands of the services based on the elastic thread assignment algorithms, Capsules can be configured independently which can lead to capsule customization, depending on e.g. slice type, etc.

Depending on their role, capsules can be grouped per RAN, slice, UE or bearer which allows for designation-based capsule grouping. It can be beneficial in terms of capsule isolation and scaling. For example, separate modules can be created for each new user. If a need arises, users can be easily migrated between modules in different physical hosts and grouped together in order to apply similar treatment or support similar QoS (e.g., delay).

In various examples and/or embodiments, the use of a capsule based, highly modular, scalable and polymorphic design that is further based on a Liquidity Controller provides the following advantages:

Flexible design for different scenarios:

Given a capsule brings the atomic functionality piece of the RAN stack, the stack itself can be decomposed into any number of modules (containing at least one capsule or as many as all capsules). This feature provides following advantages:

The stack can be disaggregated to fit into any distribution of computing resources, therefore utilizing existing or available computing infrastructure to a greater extent, Capsules can be grouped together in various perspectives e.g., i) per user, ii) per slice iii) per bearer iv) per functionality (e.g. grouping schedulers from different stacks to perform cell-free scheduling). It gives the unprecedented possibility of functional isolation (similar functions grouped together for more effective collaboration service isolation (functions related to specific service (e.g., particular user) can be grouped together for security, reliability or scaling purpose) leading to higher portability, and simplified manageability, Modules representing stack services can be customized, given the specific functionality of the capsules included. This gives the possibility to create different variants of the same stack blocks fitting different scenarios. E.g. it can be easy to create multiple copies of CU user-plane: a) CU_U_basic (for standard deployment), b) CU_U_scalable (for enabling scalability of user-plane) and c)

CU_U_LBO for enabling special routing inside the PDCP that allows rule-based traffic redirection for enabling the local breakout to local streaming server, flexible scaling—virtualized modules can be scaled with the use of existing orchestration tools. The capability to define and control the amount and type of capsules per module adds up to the scaling flexibility of RAN stack (e.g., fine grained or coarse grained).

Capsules can be configured independently and arbitrarily. This can impose different behavior of different instances of the same capsule further improving the flexibility of the deployment. For example, a capsule containing PDCP functionality can be configured in AM (Acknowledged Mode) or UM (Unacknowledged Mode). Such customization can be extrapolated to whole modules (see, e.g., "Example 2" described below), Communication optimization possibility through adjusting communication means per capsule pair, e.g. high speed communication between capsules within a module (shared-memory) and any communication protocol used across modules. It enables adjustment of the RAN stack disaggregation towards target scenario (e.g. low latency), Seamless operations and adjustment to changing requirements-module polymorphism allows RAN stack to change the module composition at run-time. This in turn can lead to a scenario where software can intentionally redistribute its functionalities across modules, across different computing nodes (together with user context migration). Mechanisms like this (whether distributed or centralized) can pave the way for functionality migration and fault management mechanisms which can work without direct intervention of the orchestrator and hence have a much faster reaction ensuring seamless user experience.

Figure 3:
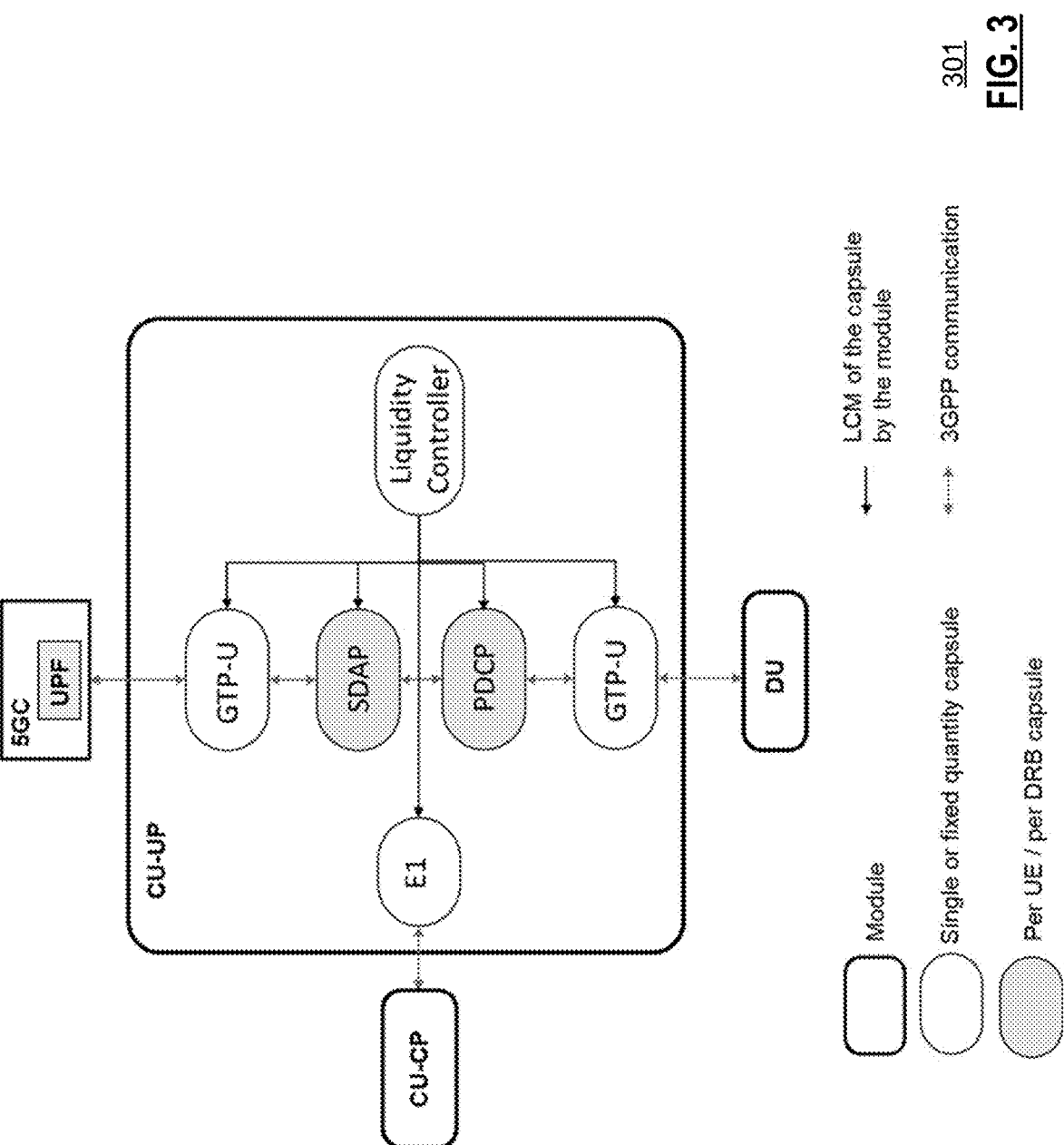
FIG. 3 is a schematic/block diagram 301 illustrating a non-limiting example of a RAN stack component disaggregation in accordance with various aspects described herein.

Example 1: A Module Covering CU-UP Functionality Disaggregated into Capsules As mentioned, capsules enable forming of the modules of arbitrary functionality. In this example we present a disaggregation of the upper part of the protocol stack into capsules. Capsules are aggregated into a module whose functionality is equivalent to CU-UP (see, e.g., FIG. 3). In this example implement whole protocols from the protocol stack (PDCP, SDAP), as well external interfaces (GTP-U, E1), however the granularity of the capsules can be higher where it is deemed suitable (e.g. PDCP can be divided into PDCP_High and PDCP_Low). Moreover, FIG. 3 also shows that the capsules related to 3GPP protocols can be instantiated separately for the user or bearer.

Figure 4:
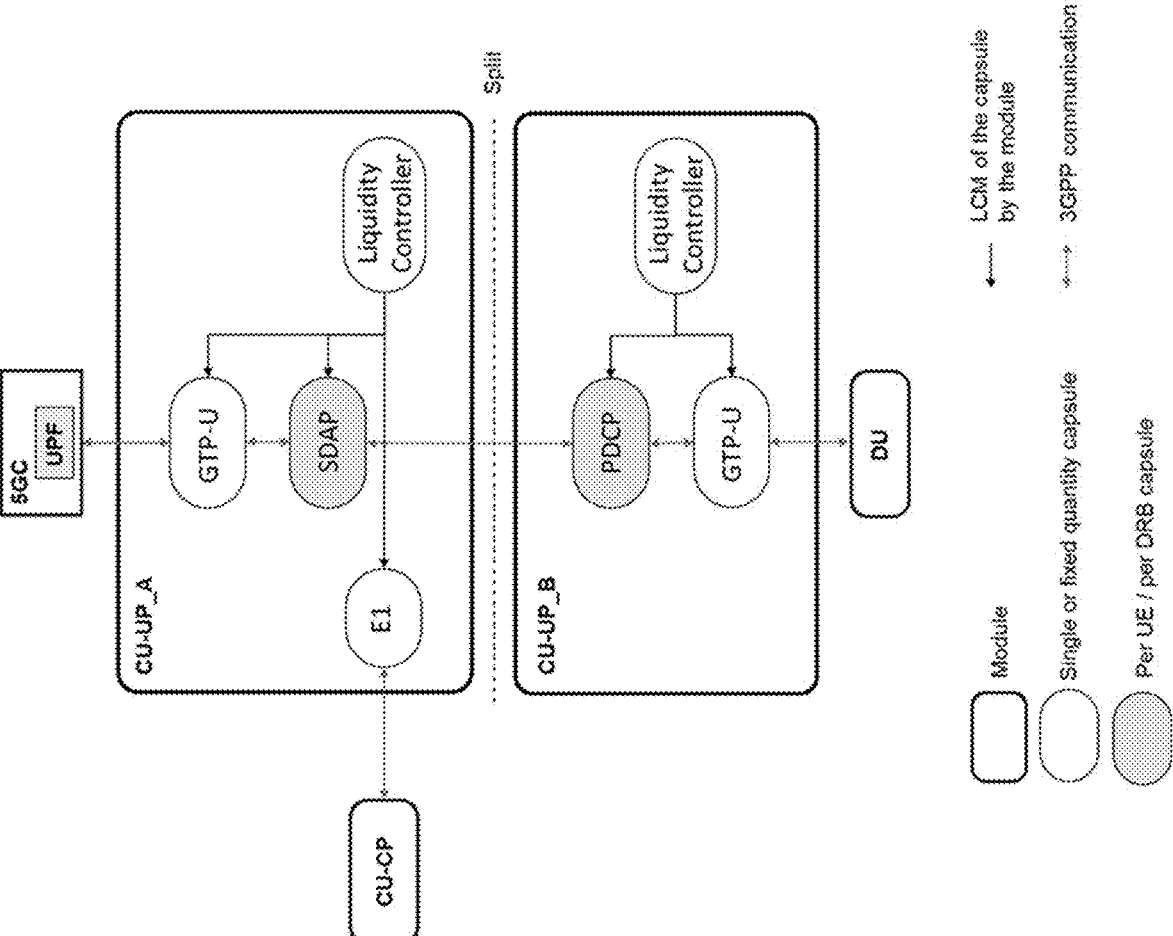
FIG. 4 is a schematic/block diagram 401 illustrating another non-limiting example of a RAN stack component disaggregation in accordance with various aspects described herein.

In addition, a stack functional component (e.g. CU-UP) can be either centralized or distributed between multiple modules (and also processing nodes)—see FIG. 4 for an example of a distributed deployment.

Example 2: Natural Support for Slicing Based on the Decoupled vRAN Design

Owing to the architecture introduced herein and the presented benefits of the flexible RAN, it becomes straightforward to customize the capsule or, as a consequence, the module depending on e.g. user group or slice (application type) in order to add, remove or tweak some functionality.

Figure 5:
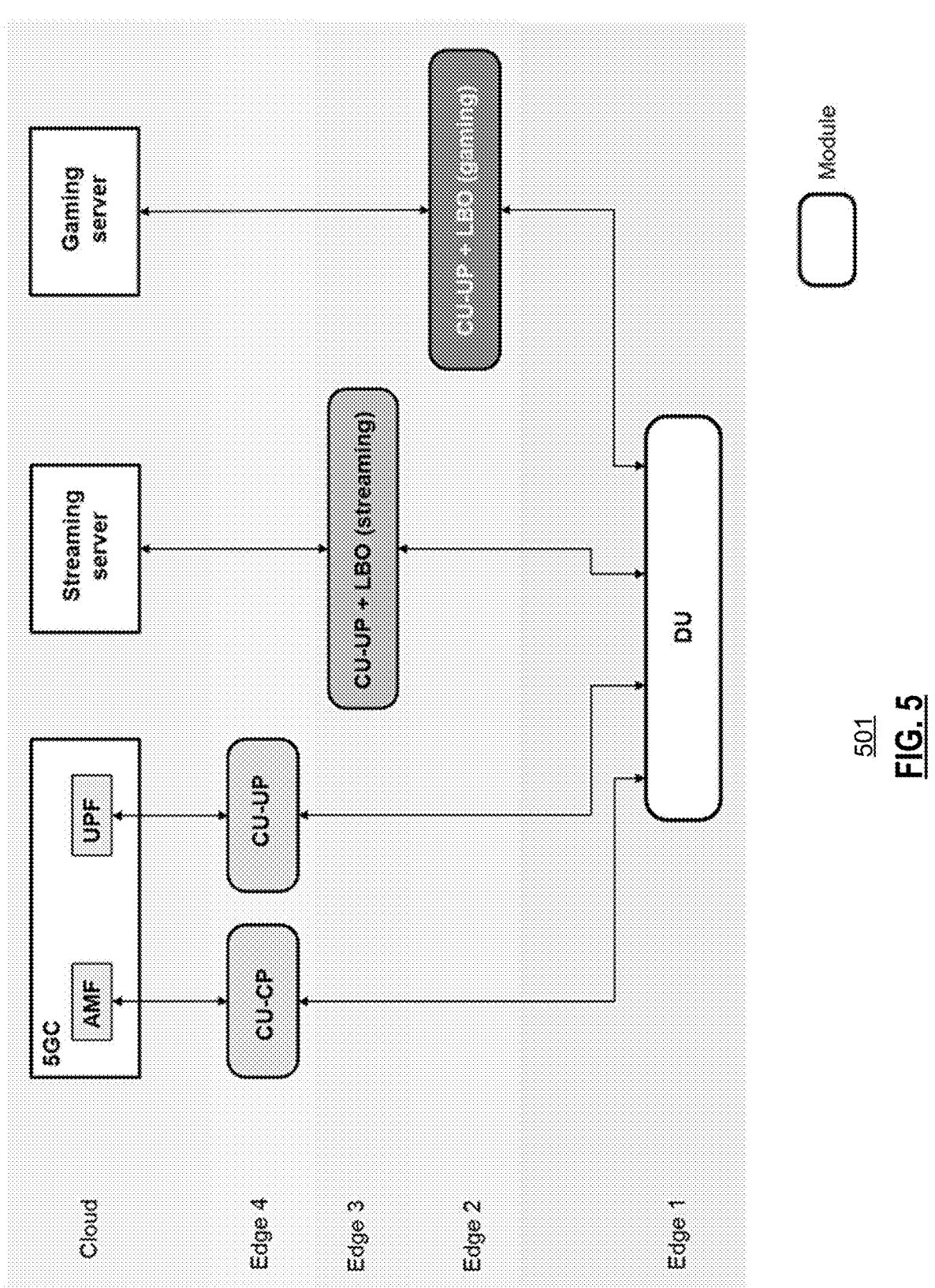
FIG. 5 is a schematic/block diagram 501 illustrating a non-limiting example of slicing support in accordance with various aspects described herein.

Such customized modules, similarly to any RAN module, can be deployed across various locations. FIG. 5 demonstrates a situation where the different capsule-based customizations of the CU module are configured: i) CU_CP, ii) CU_UP (basic), iii) CU_UP+LBO (streaming), iv) CU_UP+LBO (gaming), where LBO stands for Local Breakout. Capability of having various types of CU instances is determined by the LC functionality, moreover the different location of DU and CUs is also possible and determined by the LC.

In accordance with this example of delivering slicing functionality, it is enough for the LC to indicate the functionalities (e.g., profiles) of the capsules dedicated to deal with processing of the particular application types signaling and data.

Example 3: Implementation of Cooperative Mechanisms in Future Wireless Systems The architecture presented herein is capable of going beyond currently available specifications (e.g. of 3GPP, ORAN). One such example is the situation in which a number of protocol layers (here instantiated as modules or capsules) to cooperate between each other in order to deliver new benefits (e.g. improved efficiency, improved capacity or reliability). The flexibility of capsules can be utilized and support capsule grouping due to similarity of function e.g. scheduler related capsules of different RAN stack instances can be instantiated in one module (the same physical or virtual node) in order to assure lowest delays in communication between them in order to achieve low latency scenarios. This way deployment of e.g., three different radio stacks can be performed by considering at same time: i) optimizations regarding the 5G Triangle services (horizontal view), but also ii) particular deployments needs that benefit from cooperation of capsules at certain level (vertical view). See, e.g., FIG. 6.

Figure 6:
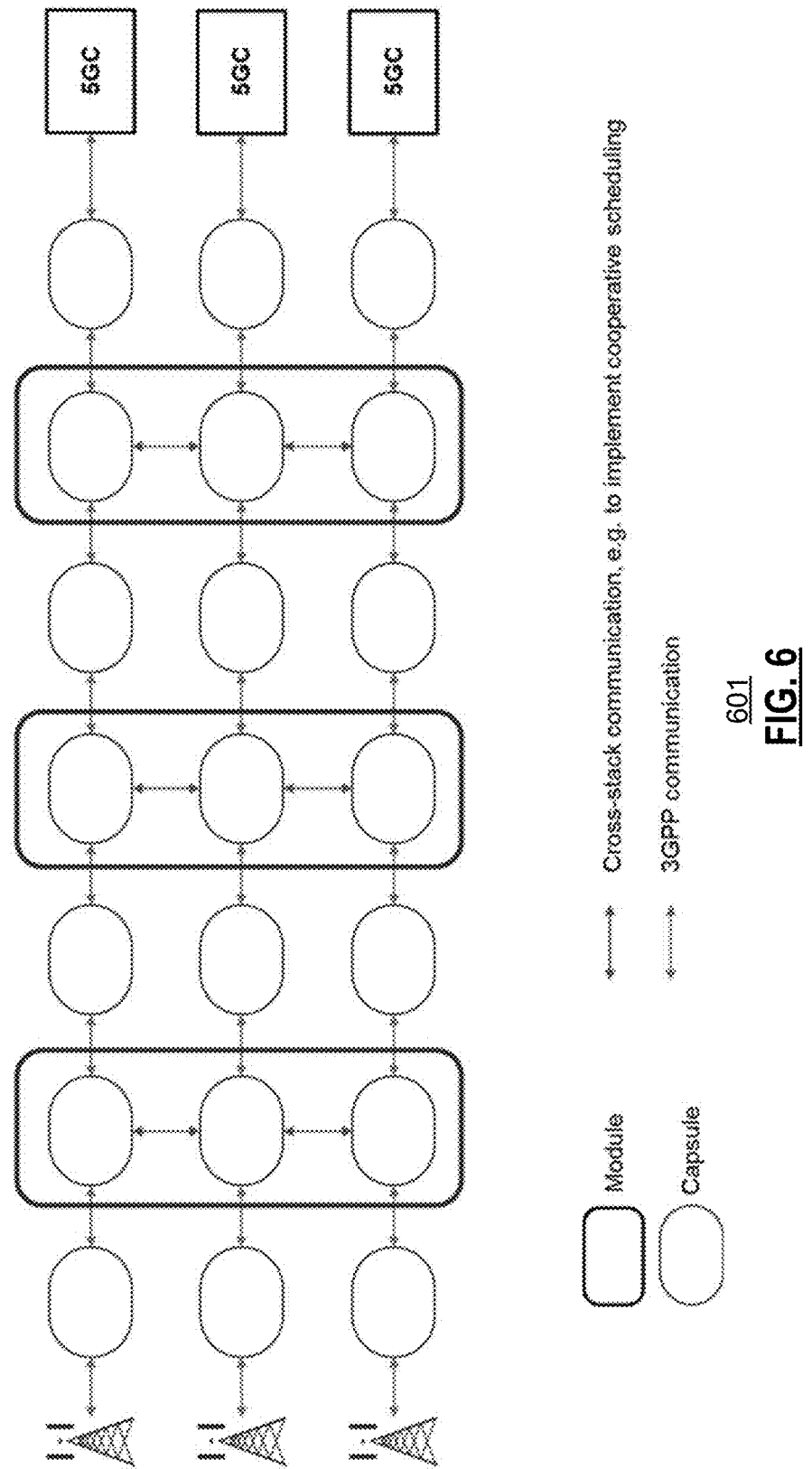
FIG. 6 is a schematic/block diagram 601 illustrating a non-limiting example of RAN stack instance cooperation in accordance with various aspects described herein.

FIG. 6. depicts an example situation in which instances of multiple radio stacks (i.e. one stack represents one cell) would need to exchange information (vertically) in a standardized (or non-standardized) way, in order to achieve some cross-stack improvements e.g. with respect to: efficiency, reliability, security or other perspectives. The proposed building-blocks of the SW-architecture described above, would be able to naturally support such cooperative behaviors with the use of: LC component, appropriately configured modules and a set of capsules.

A particular example would be a cooperative scheduling paradigm that would be useful in a situation where cooperation in resource allocation is assumed among multiple RU. In order to be successfully implemented, it would be desirable to includes a non-standard implementation of a scheduler that is able to control resources belonging to multiple radio units (RU), under control of a single (or multiple) DU. Examples of such techniques for cooperative scheduling are presented in U.S. Patent Publication 2022/0210794 entitled, COOPERATIVE RADIO RESOURCE SCHEDULING IN A WIRELESS COMMUNICATION NETWORK AND METHODS FOR USE THEREWITH, that was published on Jun. 30, 2022, the contents of which are incorporated by reference for any and all purposes. The mechanism utilizes low latency communication between RAN components which contain the scheduler. It can be realized by means of proposed SW architecture where relevant capsules responsible for scheduling are either located in one module (and benefit from in-process communication) or are located in modules interconnected with low latency links and/or being in the vicinity of each other. In various examples and/or embodiments, cooperative scheduling can be then achieved through the communication between relevant capsules which are part of different protocol stacks.

Example 4: Capsule Migration

Figure 7:
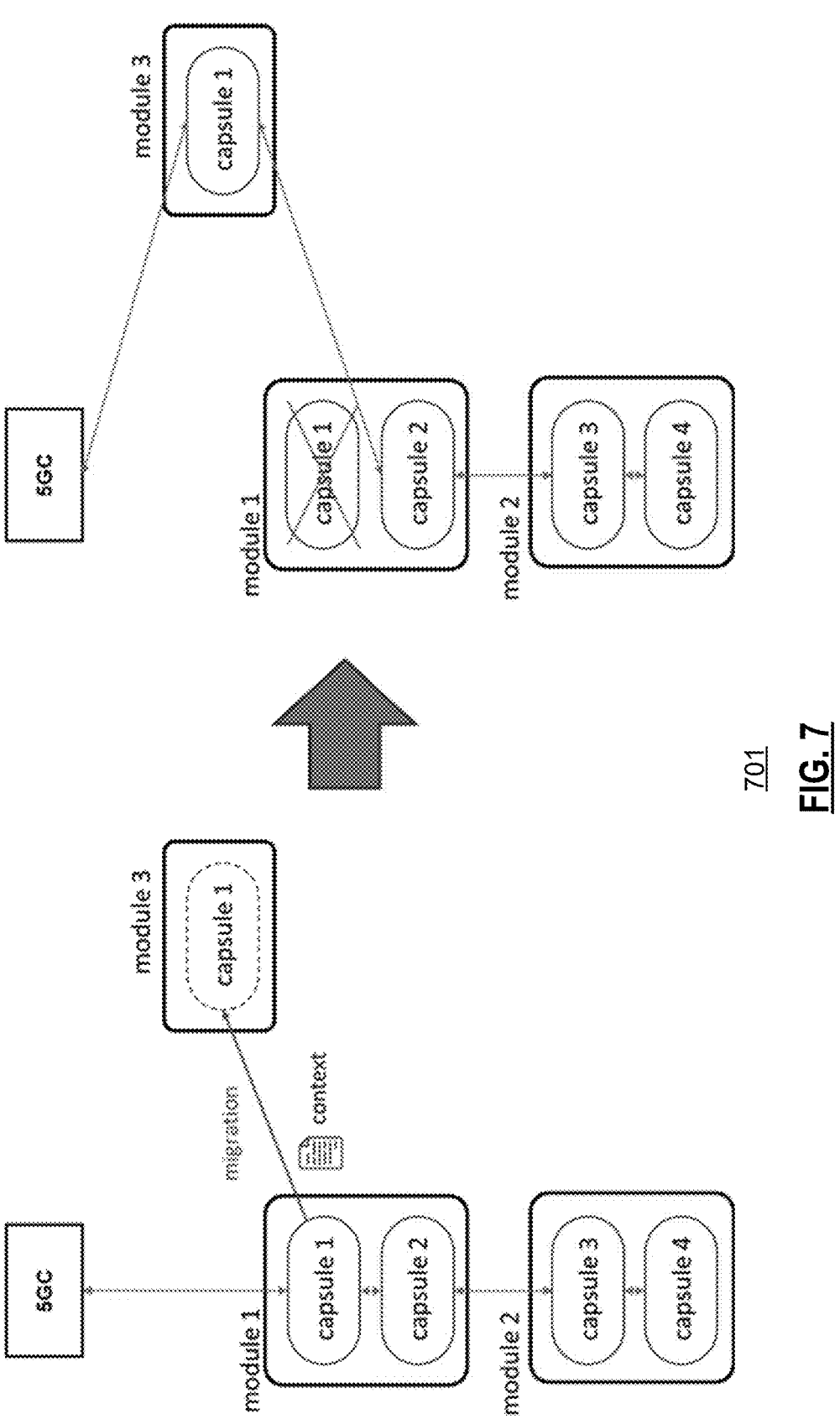
FIG. 7 is a schematic/block diagram 701 illustrating a non-limiting example of capsule migration in accordance with various aspects described herein.

With the design provided by the SW architecture disclosed herein, the migration of the functionality between modules is simplified and can be used for a number of overlying mechanisms. Functionality migration process aims at moving capsules (and hence the functionalities capsules represent) between modules (see., e.g., FIG. 7).

The migration can be performed either in real-time (so called live migration) i.e. without service interruption, or offline where the interruption will occur because of higher latency. The way the migration is performed depends on the nature of the capsule. Migration relies on two mechanisms:

capsule recreation—removing capsule of focus in one module and recreating it in desired module context migration—if necessary context (e.g. state information) must be moved between to-be-removed capsule and newly created instance of that capsule.

In various examples and/or embodiments, migration enables changing the deployment structure of the stack, i.e. the distribution of capsules among modules during the stack run-time. The process can cause down time because of the context transfer between capsules. For some capsules, where live migration can be achieved, down time could be completely eliminated.

Example 5: Fault Management

In various examples and/or embodiments, fault management can be understood as a mechanism which aims at two main aspects:

Fault recovery—mechanisms aiming at restoring the correct operation of the software in the face of a defect. A fault may occur due to bad connections between modules or non-working hardware. It can be realized for example by:

Quick redeployment (e.g. in case of docker based deployment)

Change of data path

Fault prevention—preventing failures to happen. One of the methods to do so is adding redundancy to existing network functions.

Figure 8:
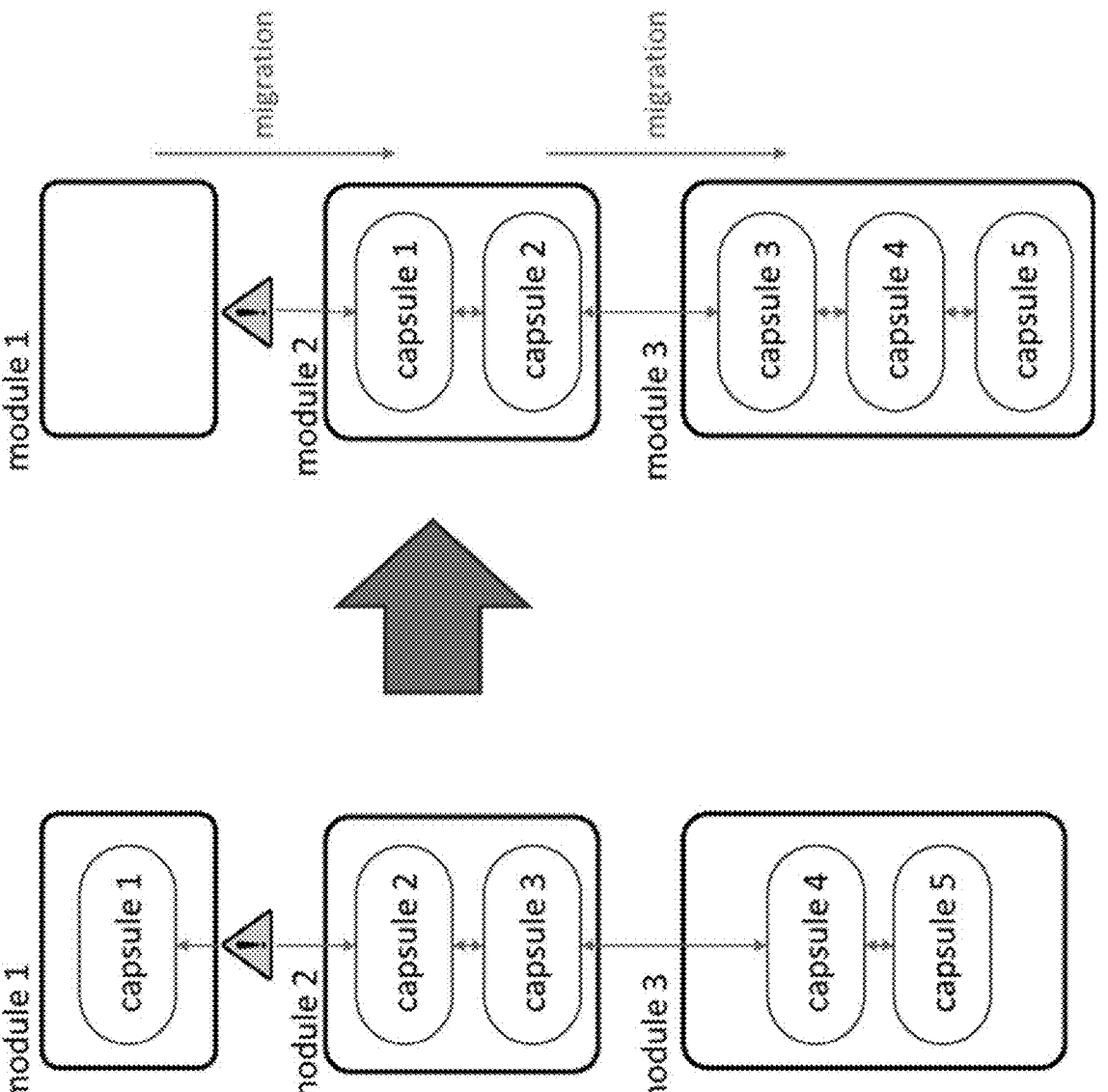
FIG. 8 is a schematic/block diagram 801 illustrating a non-limiting example of fault management in accordance with various aspects described herein.

In various examples and/or embodiments, fault management can take advantage of the migration process. The idea behind is that capsules and their embedded functionality can be moved between modules if one of the modules experiences a malfunction or there is an interrupted connectivity between two modules. In this case capsules from one module can migrate to another one which is deemed safe and has enough computing capacity to accommodate a new capsule. An example of the process in action can be seen in FIG. 8, where a faulty link between two modules 1 and 2 (which can be caused e.g., by high latency or other fault) triggers migration of capsules (here, stack layers) between modules 1 and 2 as well as 2 and 3.

Fault management which relies on stack specific process like migration can presumably take much less time than the typical alternative approach, which is the redeployment of all modules by the external orchestrator (e.g. Kubernetes). The reaction can take milliseconds rather than seconds that would take for an orchestrator to redeploy a module. Moreover, the orchestrator would create a new module and capsules and the context will be lost leading to the RAN down time. Even if the context migration is not possible for certain capsules, respawning capsules in different modules without context migration could potentially be a faster solution to the orchestrator's redeployment of a faulty module.

Example 6: Security: Functionality Evacuation

Another practical application of the capsules and their migration mechanism is a security mechanism which can act upon the threat related to the hardware infrastructure attack (e.g. server) but also software infrastructure attack (e.g. OS). Once the attack is detected, RAN stack functionality (represented by capsules) can be migrated to other modules placed in a different, more secure domain.

Example 7: Security: Detection and Mitigation

Security mechanisms adopted in addition to the application functionality place an additional overhead which can hinder the overall application performance. To mitigate this undesired effect the security approach can rely on capsule architecture in order to minimize the overall footprint of the security mechanisms in terms of the computing resource consumption. Security mechanisms an be present only in the modules which are prone to security attacks (e.g. RRC DDoS attack). Other modules can then work without extra overhead. In such design security functions can be the capsules themselves and be orchestrated by the Liquidity Controller. An example of such security mechanisms can be Detection (DC) and Mitigation (MC) capsules. DC will be monitoring traffic/CPU and detecting attacks. DCs utilize the fact that some attacks are earlier detected at some layers (e.g. signaling attack at the RLC in Acknowledged mode). MC will be addressing RAN availability threats (e.g. DDoS) and network infrastructure attacks which will force protection actions at relevant RAN modules (e.g., dedicating more resources to the affected capsule).

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. The processing module, module, processing circuit, processing circuitry, and/or processing unit can further include one or more interface devices for communicating data, signals and/or other information between the components of the processing module and further for communicating with other devices. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in the form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A radio access network (RAN) system comprises:
a plurality of capsules that operate in parallel to cooperatively perform RAN stack operations, each capsule utilizing a processor and a memory configured to perform a corresponding component of the RAN stack operations, wherein the RAN stack operations result in:
communicating backhaul communications with a core communication network;
communicating fronthaul communications with a plurality of radio units configured to engage in wireless communications with a plurality of user equipment (UEs) via a radio channel of a radio network;
converting, in accordance with a communication standard, received fronthaul communications from the plurality of radio units into backhaul communications transmitted to the core communications network; and
converting, in accordance with the communication standard, received backhaul communications from the core communications network into fronthaul communications transmitted to the plurality of radio units;
wherein a first subset of capsules is implemented by a first module under control of a first liquidity controller, wherein a second subset of capsules is implemented by a second module under control of a second liquidity controller, wherein the first subset of capsules are mutually exclusive of the second subset of capsules, and wherein multiplexers in the first module and the second module support logical links between two or more of the first subset of capsules and two or more of the second subset of capsules.

2. The RAN system of claim 1, wherein the first liquidity controller controls life cycle management tasks of the first subset of capsules and the second liquidity controller controls life cycle management tasks of the second subset of capsules.

3. The RAN system of claim 1, wherein the first liquidity controller is configured to selectively add a new capsule to the first subset of capsules and wherein the first liquidity controller is further configured to selectively remove an existing capsule from the first subset of capsules.

4. The RAN system of claim 1, wherein at least one first capsule of the first subset of capsules communicates directly with at least one second capsule of the second subset of capsules.

5. The RAN system of claim 1, wherein the first liquidity controller and the second liquidity controller cooperate to support migration of a first capsule from the first subset of capsules to the second subset of capsules.

6. The RAN system of claim 5, wherein the migration includes:
recreating the first capsule as a new first capsule in the second module;
moving a context to the new first capsule in the second module; and
removing the first capsule from the first module.

7. The RAN system of claim 5, wherein the migration is performed during stack run-time.

8. The RAN system of claim 5, wherein the migration is triggered by a fault.

9. The RAN system of claim 5, wherein the migration is performed as part of a fault prevention.

10. The RAN system of claim 5, wherein the migration is performed as part of a security mechanism in response to a security attack on the RAN.

11. The RAN system of claim 10, wherein the plurality of capsules include a detection capsule configured to monitor network traffic and/or system hardware and to detect the security attack.

12. The RAN system of claim 10, wherein the plurality of capsules further include a mitigation capsule configured to mitigate the security attack via one or more protective actions.

13. The RAN system of claim 10, wherein the first liquidity controller controls life cycle management tasks of the first subset of capsules, wherein the first liquidity controller is configured to selectively add a new capsule to the first subset of capsules and wherein the first liquidity controller is further configured to selectively remove an existing capsule from the first subset of capsules.

* * * * *